(12) United States Patent
Takeda

(10) Patent No.: US 8,066,783 B2
(45) Date of Patent: Nov. 29, 2011

(54) SOLID ELECTROLYTIC CAPACITOR AND MANUFACTURING METHOD THEREFOR

(75) Inventor: Yasushi Takeda, Nara (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 60 days.

(21) Appl. No.: 11/343,221

(22) Filed: Jan. 31, 2006

(65) Prior Publication Data

US 2007/0033783 A1 Feb. 15, 2007

(30) Foreign Application Priority Data

Feb. 2, 2005 (JP) ................................. 2005-026468

(51) Int. Cl.
*H01G 9/00* (2006.01)
(52) U.S. Cl. ....... 29/25.03; 361/523; 361/528; 361/529; 361/531
(58) Field of Classification Search ................. 29/25.03; 257/213; 361/523, 528, 529, 531
See application file for complete search history.

(56) References Cited

U.S. PATENT DOCUMENTS

| | | | | |
|---|---|---|---|---|
| 5,068,219 | A  * | 11/1991 | Hagino et al. | ........... 505/231 |
| 7,295,425 | B2 * | 11/2007 | Suenaga et al. | ........... 361/523 |
| 7,385,804 | B2   | 6/2008  | Kuriyama | |
| 2004/0089945 | A1 * | 5/2004  | Omori et al. | ........... 257/736 |
| 2006/0285276 | A1 * | 12/2006 | Kuriyama | ........... 361/523 |
| 2007/0188982 | A1 * | 8/2007  | Kuriyama | ........... 361/528 |
| 2008/0218944 | A1   | 9/2008  | Kuriyama | |

FOREIGN PATENT DOCUMENTS

| | | |
|---|---|---|
| JP | 03-227006 A | 10/1991 |
| JP | 403227006 A * | 10/1991 |
| JP | 3535014 | 3/2004 |
| WO | 2005-015588 A1 | 2/2005 |

OTHER PUBLICATIONS

Yamane, Masayuki, Solid Electrolytic Capacitor, Oct. 8, 1991, English language Abstract of JP 403227006A.*
Japanese Office Action dated Feb. 23, 2010, issued in corresponding Japanese Patent Application No. 2005-026468.

* cited by examiner

*Primary Examiner* — Angel Roman
(74) *Attorney, Agent, or Firm* — Westerman, Hattori, Daniels & Adrian, LLP

(57) ABSTRACT

A solid electrolytic capacitor of the present invention includes an anode element made of a sintered body of a valve-action metal; a dielectric coating, a solid electrolyte layer, and a cathode lead layer, sequentially formed on a surface of the anode element; and an anode lead member made of a conductive metal projecting from the anode element, the anode lead member having a base end thereof embedded in the anode element, the base end being formed such that a cross section thereof perpendicular to a direction extending inwardly of the anode element has a contour with four rounded rectangular corners.

8 Claims, 5 Drawing Sheets

US 8,066,783 B2

SOLID ELECTROLYTIC CAPACITOR AND MANUFACTURING METHOD THEREFOR

The priority application No. 2005-026468 upon which this patent application is based is hereby incorporated by reference.

BACKGROUND OF THE INVENTION

1. Field of the Invention

The present invention relates to a solid electrolytic capacitor including an anode element made of a sintered body of a valve-action metal and an anode lead member projecting from the anode element, and to a manufacturing method therefor.

2. Description of Related Art

A solid electrolytic capacitor having a structure shown in FIG. 9 has been conventionally known. The solid electrolytic capacitor includes an anode element 31 made of a sintered body of powder of a valve-action metal (tantalum, niobium, titanium, aluminum, etc.). Sequentially formed on a surface of the anode element 31 are a dielectric coating 33 made by oxidizing the anode element surface, a solid electrolyte layer 34 made of a conductive inorganic material such as manganese dioxide or a conductive organic material such as TCNQ complex salt, a conductive polymer, etc., and a cathode lead layer 35 made of a carbon layer, silver layer, etc. An anode lead member 26 made of a conductive metal projects from the anode element 31 in one direction. As shown in FIG. 10, the anode lead member 26 is formed in the form of a flat quadrangular prism with a rectangular cross-sectional shape, and has a base end thereof embedded in the anode element 31.

As shown in FIG. 9, an anode lead frame 40 is connected to the anode lead member 26, while a cathode lead frame 41 is connected to the cathode lead layer 35 through a conductive adhesive 36. A periphery of the anode element 31 is coated and sealed by an enclosure resin layer 37 made of epoxy resin or the like. The anode lead frame 40 and cathode lead frame 41 are partly exposed from the enclosure resin layer 37.

As shown in FIG. 10, the anode lead member 26 formed in the form of a flat quadrangular prism with a rectangular cross-sectional shape can provide a larger joint area between the anode lead member 26 and the powder of the valve-action metal of the anode element 31 than a cylindrical anode lead member with a circular cross-sectional shape. Therefore, a resistance is reduced at a joint point between the anode lead member 26 and the valve-action metal powder of the anode element 31 to lower an equivalent series resistance (ESR). Furthermore, a large current can flow through the solid electrolytic capacitor by increasing the joint area between the anode lead member 26 and the valve-action metal powder of the anode element 31 (see JP 3535014, B).

The anode element 31 having the anode lead member 26 projected therefrom as shown in FIG. 10 is prepared by vacuum-sintering a molding of the valve-action metal powder having the base end of the anode lead member 26 embedded therein. However, the anode element 31 having the anode lead member 26 projected therefrom as shown in FIG. 10 has a problem of, as shown in FIG. 11, occurrence of a crack 30 from a boundary between the anode lead member 26 and anode element 31, in particular, from corners of the anode lead member 26 in a face 32 of the anode element 31 having the anode lead member 26 projected therefrom after the preparation of the anode element 31 by vacuum-sintering the molding of the valve-action metal powder.

Even if the anode element 31 and anode lead member 26 are of the same material, the anode element 31 can have a smaller density than the anode lead member 26, such that the anode element 31 can have a larger linear expansion coefficient than the anode lead member 26 due to the difference in density between the anode element 31 and anode lead member 26. This causes the anode element 31 to contract more greatly than the anode lead member 26 when the anode element 31 is cooled after the molding of the valve-action metal powder is vacuum-sintering to prepare the anode element 31. The thermal stress concentrates especially on the corners of the anode lead member 26 of the anode element 31. This is probably the cause of the occurrence of the crack 30.

The occurrence of the above-described crack 30 at the anode element 31 increases a leak current at the anode element 31, and therefore degrades the performance of the solid electrolytic capacitor to lower the yield.

SUMMARY OF THE INVENTION

An object of the present invention is to provide a solid electrolytic capacitor, and manufacturing method therefor, adapted to prevent cracks from occurring at the anode element to avoid increase of a leak current.

A solid electrolytic capacitor of the present invention includes an anode element 1 made of a sintered body of a valve-action metal; a dielectric coating 2, a solid electrolyte layer 3, and a cathode lead layer 4, sequentially formed on a surface of the anode element 1; and an anode lead member 6 made of a conductive metal projecting from the anode element 1 in one direction, the anode lead member 6 having a base end 60 thereof embedded in the anode element 1, the base end 60 being formed such that a cross section thereof perpendicular to a direction extending inwardly of the anode element 1 has a contour with four rounded rectangular corners.

According to the solid electrolytic capacitor of the present invention, since the base end 60 of the anode lead member 6 embedded in the anode element 1 omits square corners, the thermal stress concentrates nowhere in the boundary between the anode element 1 and the base end 60 of the anode lead member 6 when the anode element 1 is cooled after the molding of the valve-action metal is vacuum-sintered to prepare the anode element 1. This can suppress the occurrence of cracks at the anode element 1.

In a further specific construction, the corners are rounded by an arc curve. In the specific construction, the contour of the cross section of the base end 60 may be in the form of an ellipse consisting of the arc curve.

In a more specific construction, the contour of the cross section of the base end 60 includes the arc curve and a plurality of straight lines extending tangentially from both ends of the arc curve.

In another specific construction, the contour of the cross section of the base end 60 is defined by a pair of straight lines parallel with each other having both ends thereof coupled by a pair of smooth curves expanding outwardly from the both ends.

In a further specific construction, the pair of straight lines are formed such that each length thereof is longer than a distance between the pair of straight lines. In a more specific construction, the curves are formed in the form of an arc, while the straight lines extend tangentially of the curves. Here, the contour of the cross section of the base end 60 of the anode lead member 6 is formed by rolling a conductive metal wire 71 with a circular contour of a cross section thereof between a pair of rollers 70, 70.

Furthermore, a solid electrolytic capacitor of the present invention includes an anode element 1 made of a sintered body of a valve-action metal; a dielectric coating 2, a solid electrolyte layer 3, and a cathode lead layer 4, sequentially formed on a surface of the anode element 1; and an anode lead member 6 made of a conductive metal projecting from the anode element 1 in one direction, the anode lead member 6 having a base end 60 thereof embedded in the anode element 1, the base end 60 being formed such that a cross section thereof perpendicular to a direction extending inwardly of the anode element 1 has a contour with four rounded rectangular corners, the contour of the cross section of the base end 60 being formed by rolling a conductive metal wire 71 with a circular contour of a cross section thereof between a pair of rollers 70, 70.

A manufacturing method for a solid electrolytic capacitor of the present invention includes a first step of rolling a conductive metal wire 71 with a circular contour of a cross section thereof between a pair of rollers 70, 70, and cutting the wire 71 into a predetermined length to obtain an anode lead member 6; a second step of charging a valve-action metal powder into molding means and embedding a base end 60 of the anode lead member 6 in the valve-action metal powder, and thereafter pressurizing the valve-action metal powder to obtain a molding of the valve-action metal powder; and a third step of vacuum-sintering the molding of the valve-action metal powder obtained in the second step to obtain an anode element 1.

In a further specific construction, the first step includes rolling the wire 71 until surfaces thereof contacting the rollers 70 become flat.

DETAILED DESCRIPTION OF THE INVENTION

Figure 1:
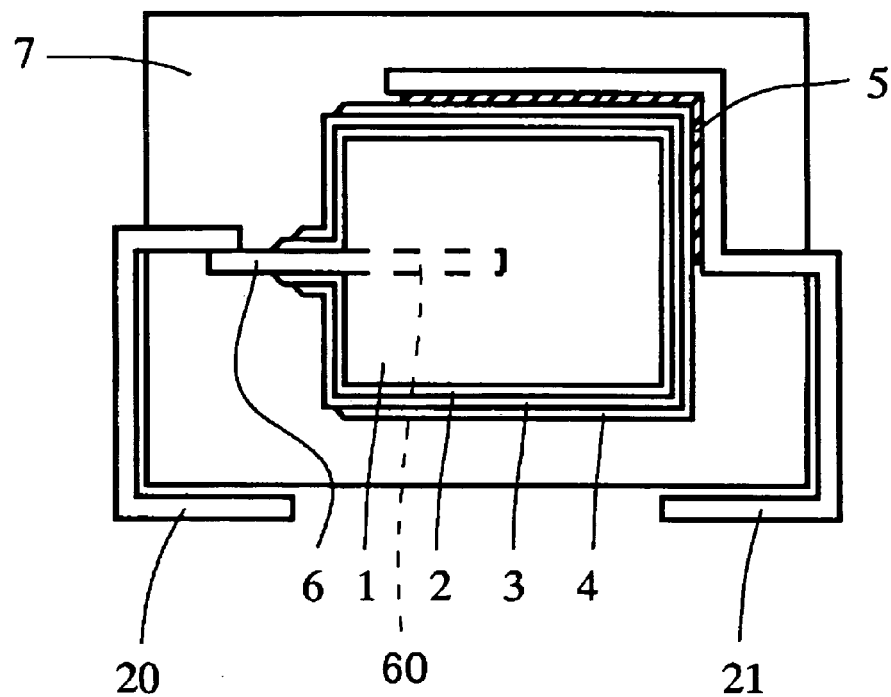
FIG. 1 is a vertical cross-sectional view of a solid electrolytic capacitor of the present invention.

An embodiment of the present invention will be specifically described below with reference to the drawings. A solid electrolytic capacitor of the present invention has, as shown in FIG. 1, an anode element 1 made of a sintered body of a valve-action metal of tantalum powder formed in the form of a rectangular parallelepiped. Sequentially formed on a surface of the anode element 1 are a dielectric coating 2 made by oxidizing the anode element surface, a solid electrolyte layer 3 made of a conductive inorganic material such as manganese dioxide or a conductive organic material such as TCNQ complex salt, a conductive polymer, etc., and a cathode lead layer 4 having a carbon layer and silver layer sequentially laminated therein.

Figure 2:
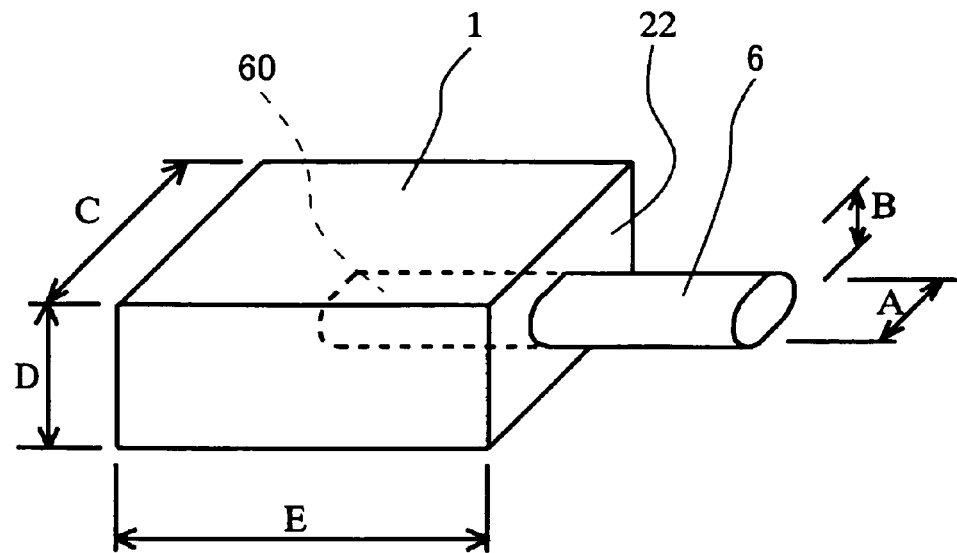
FIG. 2 is a perspective view of an anode element having an anode lead member projected therefrom.
Figure 3:
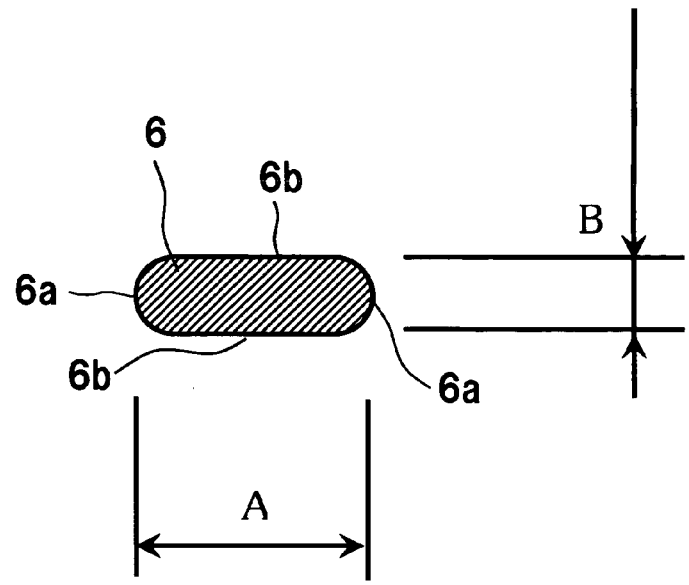
FIG. 3 is a cross-sectional view of the anode lead member.
Figure 4:
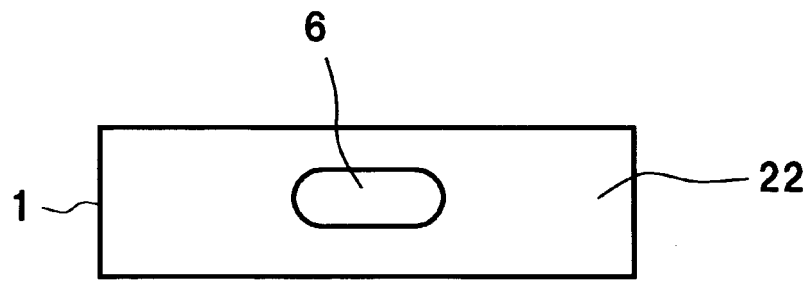
FIG. 4 is a front view of the anode element having the anode lead member projected therefrom.
Figure 5:
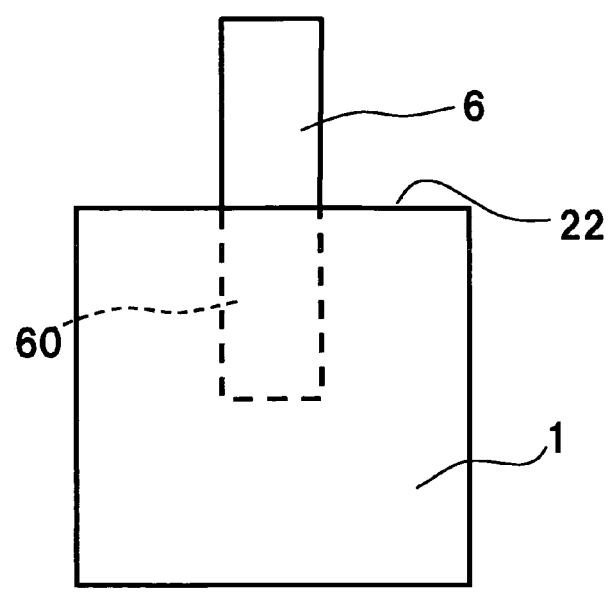
FIG. 5 is a top view of the anode element having the anode lead member projected therefrom.

As shown in FIG. 2, an anode lead member 6 made of a valve-action metal of tantalum projects from the anode element 1 in one direction. The anode lead member 6 is in the form of a flat column without square corners on the sides. As shown in FIG. 3, a contour of a cross section of the anode lead member 6 perpendicular to a projecting direction thereof is generally in the form of a rectangle with rounded corners, and includes a pair of straight lines 6b, 6b parallel with each other and a pair of curves 6a, 6a coupling both ends of the straight lines, the straight lines 6b extending tangentially of the curves 6a. Width A of the anode lead member 6, namely the maximum length between the pair of curves 6a, 6a, is formed so as to be greater than thickness B of the anode lead member 6, namely a distance between the pair of straight lines 6b, 6b. As shown in FIG. 4, the anode lead member 6 projects perpendicularly from a face 22 of the anode element 1. Furthermore, as shown in FIG. 5, the anode lead member 6 has a base end 60 thereof embedded in the anode element 1.

As shown in FIG. 1, a tip end of the anode lead member 6 is connected to an anode lead frame 20, while the cathode lead layer 4 is connected to a cathode lead frame 21 through a conductive adhesive 5. A periphery of the anode element 1 is coated and sealed by an enclosure resin layer 7 made of epoxy resin or the like. The anode lead frame 20 and cathode lead frame 21 are partly exposed from the enclosure resin layer 7.

A description will be now given of a manufacturing method for the solid electrolytic capacitor of the present invention.

Figure 6:
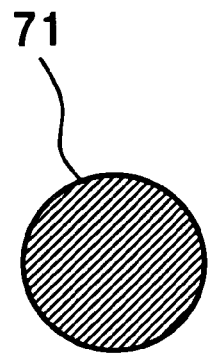
FIG. 6 is a cross-sectional view of a wire for preparing the anode lead member.
Figure 7:
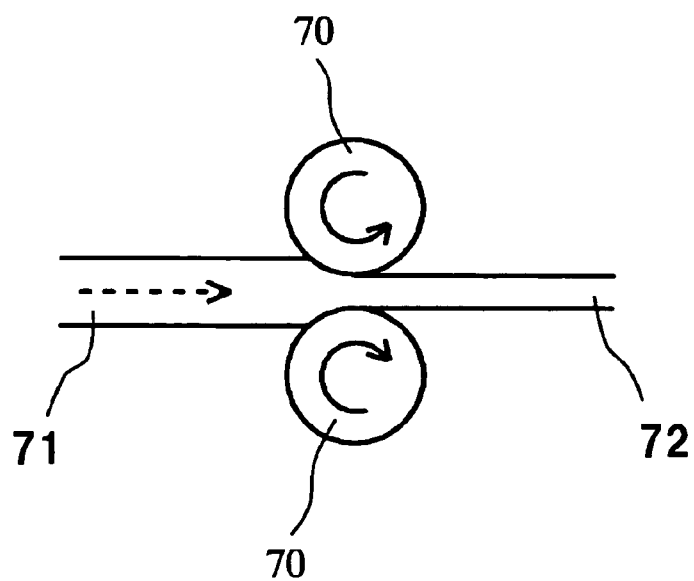
FIG. 7 shows a part of the steps for preparing the anode lead member.

First, a tantalum wire 71 with a circular cross section as shown in FIG. 6 is prepared in order to provide the anode lead member 6. Then, as shown in FIG. 7, the wire 71 is rolled between a pair of rollers 70, 70 rotating in arrow directions (solid line). During this rolling step, surfaces of the wire 71 contacting the rollers 70 are worked to be flat, such that the wire 71 is deformed to have a cross-sectional shape of the anode lead member 6 shown in FIG. 3 to provide a connected body 72 of the anode lead member 6.

Then, the connected body 72 is cut into a predetermined size to provide the anode lead member 6 shown in FIG. 2. In order to facilitate the work, the connected body 72 may of course be cut into a longer size than the anode lead member 6, and in later step cut into a size of the anode lead member 6 shown in FIG. 2.

Next, in a step of preparing the anode element 1 having the anode lead member 6 projected therefrom as shown in FIG. 2, tantalum powder mixed with binder is charged into a mold set in a molding machine (molding means), and the base end 60 of the anode lead member 6 is embedded in the tantalum powder charged into the molding means. Thereafter, the tantalum powder charged into the molding means is pressurized to prepare the molding of the tantalum powder, and the molding is vacuum-sintered.

In order to finish the solid electrolytic capacitor shown in FIG. 1, further formed sequentially on the surface of the anode element 1 are the dielectric coating 2 of the oxidized surface of the anode element 1, the solid electrolyte layer 3 made of a conductive polymer of polypyrrole, and the cathode lead layer 4 having a carbon layer and silver layer sequentially laminated therein, and the anode lead frame 20 is connected to the anode lead member 6, while the conductive adhesive 5 is applied to the cathode lead layer 4 to connect the cathode lead layer 4 and cathode lead frame 21 by the conductive adhesive 5. Then, the periphery of the anode element 1 and anode lead member 6 is coated and sealed with the enclosure resin layer 7 made of epoxy resin or the like. These steps are known and therefore not described in detail.

EXAMPLE

The anode lead member 6 of the Example is prepared by rolling the wire 71 with a diameter of 0.58 mm in the rolling step shown in FIG. 7. Width A of the anode lead member 6 is 0.87 mm, while thickness B thereof is 0.30 mm. Shape dimensions of the anode element 1 shown in FIG. 2 are 3.26 mm length C of the long side and 0.9 mm length D of the short side of the face 22 having the anode lead member 6 projected therefrom, with 4.36 mm length E of the side parallel with the projecting direction of the anode lead member 6.

Comparative Example

Figure 8:
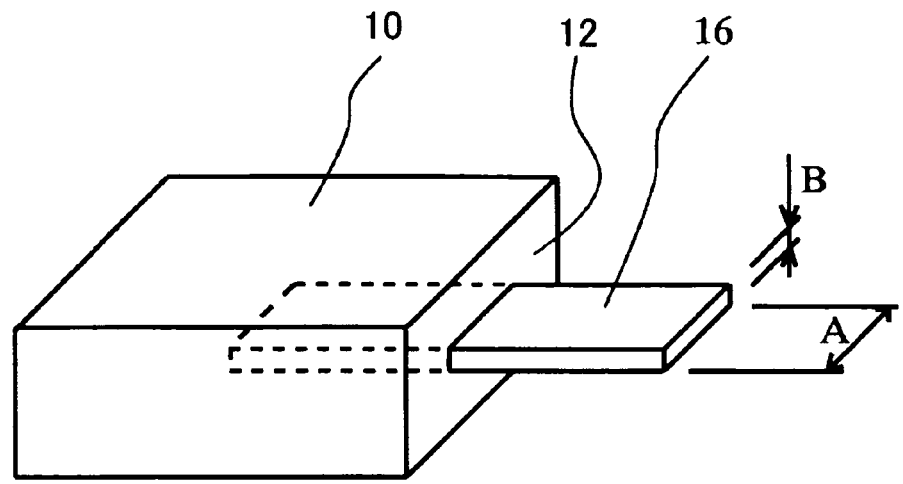
FIG. 8 is a perspective view of an anode element for a solid electrolytic capacitor of a comparative example, having an anode lead member projected therefrom.
Figure 9:
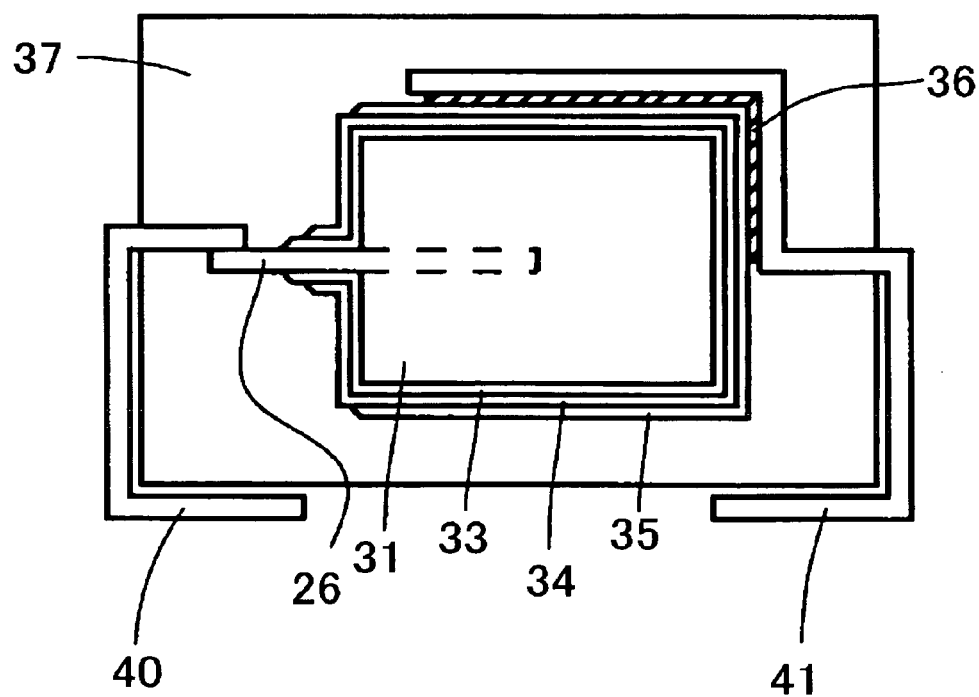
FIG. 9 is a vertical cross-sectional view of a conventional solid electrolytic capacitor.
Figure 10:
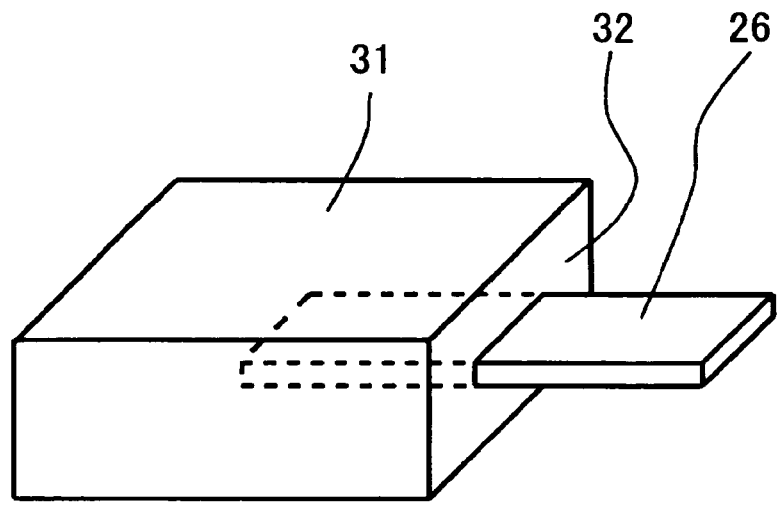
FIG. 10 is a perspective view of an anode element for the conventional solid electrolytic capacitor, having an anode lead member projected therefrom.
Figure 11:
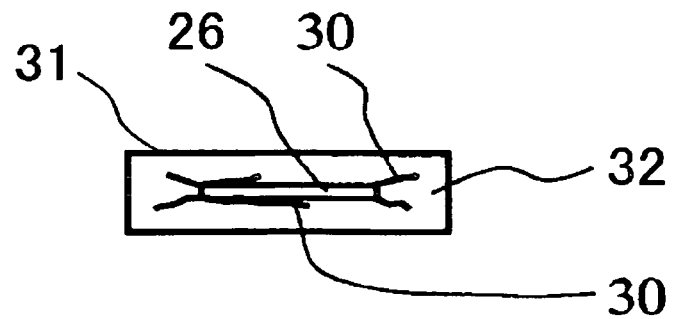
FIG. 11 is a front view of the anode element for the conventional solid electrolytic capacitor, where cracks have occurred.

FIG. 8 shows a perspective view of an anode element 10 having an anode lead member 16 of a comparative example projected therefrom. The comparative example differs from the Example only in the shape of the anode lead member 16, and is the same as the Example in other respects such as outer shape dimensions of the anode element 10 and the amount of the tantalum powder charged into the molding means. Therefore, a description of other than the difference is omitted.

The anode lead member 16 is in the form of a flat quadrangular prism with the contour of a cross section being a rectangular with four square corners. Width A of the anode lead member 16 is 1.8 mm, while thickness B thereof is 0.15 mm. Both the length of the anode lead member 16 and the length of a base end thereof embedded in the anode element 10 are the same as in the Example. The cross-sectional area of the anode lead member 16 is also approximately same as in the Example.

(Crack Occurrence Rate)

For the Example and comparative example, the moldings of the tantalum powder having the anode lead members 6, 16 embedded therein were vacuum-sintered in the same conditions to provide the anode elements 1, 10, respectively. Table 1 shows the sintering conditions.

TABLE 1

| Step | Temperature | Time (minute) | Vacuum (Pa) |
|---|---|---|---|
| Binder Removal | Rise fr. Room Temp. to 400° C. | 60 | $3 \times 10^{-3}$ or more |
| Presintering | Rise fr. 400° C. to 1400° C. | 60 | $5 \times 10^{-3}$ or more |
| Main Sitering | Maintained at 1400° C. | 20 | $5 \times 10^{-3}$ or more |
| Cooling | Fall fr. 1400° C. to 50° C. | 80 | $5 \times 10^{-3}$ or more (argon gas introduced at 500° C.) |

For the Example and comparative example, the faces 22, 12 of the anode elements 1, 10 having the anode lead members 6, 16 projected therefrom were observed using a stereo microscope to check for occurrence of cracks.

As shown in Table 2, the crack occurrence rate is 39% in the comparative example, while no crack occurs in the Example with the occurrence rate of 0%.

(Leak Current Characteristics in Anode Element)

For the Example and comparative example, the anode elements 1, 10 were checked for a leak current. As shown in Table 2, the average value of the leak current is 13.3 μA in the comparative example, but improved to be 3.9 μA in the Example.

(Leak Current Characteristics in Solid Electrolytic Capacitor)

For the Example and comparative example, solid electrolytic capacitors were manufactured using the anode elements 1, 10 measured for a leak current. Then, the solid electrolytic capacitors of the Example and comparative example were checked for a leak current, and defined as defective products if the magnitude of the leak current at five minutes after voltage application exceeds a predetermined value (0.1×C (capacitance of solid electrolytic capacitors)×V (applied voltage)). As shown in Table 2, the defective rate is 42% in the comparative example, but 6% in the Example.

The above results show that the anode element 1 of the Example has the improved crack occurrence rate at the face 22 having the anode lead member 6 projected therefrom, and accordingly has the small leak current. Furthermore, the leak current defective rate of the solid electrolytic capacitor of the Example decreases to 1/7 of that of the comparative example. This is probably greatly owed to no crack occurrence at the face 22 of the anode element 1 having the anode lead member 6 projected therefrom.

As described above, according to the present invention, the solid electrolytic capacitor can be improved in crack defects and leak current defects to achieve an improved yield and production cost reduction.

Furthermore, when a high-frequency current flows through the anode lead member 6 in the present Example, the current concentrates nowhere on the anode lead member 6 because the anode lead member 6 omits square corners. Therefore, a larger current can flow than that of the anode lead member with a square cross section, and further, the anode lead member 6 can prevent heat generation therefrom.

Tantalum is used as a valve-action metal in the Example, but the metal is not limited to this. For example, use of niobium, titanium, and aluminum can also lead to the same effect. A material of the anode lead member 6 is preferably the same valve-action metal as the anode element 1, but may be any conductive metal.

The diameter of the wire 71 and the contour size of the cross section of the anode lead member 6 are also one example, and not limited to this. In the Example, the anode lead member 6 rolled entirely by the rollers is used, but the object of the present invention can be achieved if at least only the base end 60 embedded in the anode element 1 is rolled between the pair of rollers 70, 70.

TABLE 2

| | Width A (mm) | Thickness B (mm) | Cross-sectional Area (mm$^2$) | Crack Occurrence Rate (%) Anode Element after Sintering | Leak Current (μA) Anode Element after Sintering | Leak Current Defective Rate (%) Capacitor Finished Product |
|---|---|---|---|---|---|---|
| Example | 0.87 | 0.30 | 0.264 | 0 | 3.9 | 6 |
| Comp. Ex. | 1.80 | 0.15 | 0.270 | 39 | 13.3 | 42 |

What is claimed is:

1. A solid electrolytic capacitor comprising:
   an anode element made of a valve-action metal sintered body;
   a dielectric coating provided on the anode element;
   a solid electrolyte layer provided on the dielectric coating;
   a cathode lead layer provided on the solid electrolyte layer; and
   an anode lead member consisting of a valve-action metal, the valve-action metal of the anode element and the valve-action metal of the anode member being the same, the anode lead member having a first end and a second end, the first end being embedded in the anode element upon sintering; the anode lead member being extended such that the second end is outside the cathode lead layer, the anode lead member being formed such that a cross section of the anode lead member perpendicular to a direction extending inwardly of the anode element has a contour of flat rectangular with four rounded corners over the entire length, and the cross section of the anode lead member being uniform over the entire length.

2. A solid electrolytic capacitor according to claim 1, wherein the valve-action metal is selected from the group consisting of tantalum, niobium, titanium and aluminium.

3. A solid electrolytic capacitor according to claim 1, wherein the valve-action metal is tantalum.

4. The solid electrolytic capacitor according to claim 1, wherein the corners are rounded by an arc curve.

5. The solid electrolytic capacitor according to claim 4, wherein the contour of the cross section of the anode lead member comprises the arc curve and a plurality of straight lines extending tangentially from both ends of the arc curve.

6. The solid electrolytic capacitor according to claim 1, wherein the contour of the cross section of the anode lead member is defined by a pair of straight lines parallel with each other having both ends thereof coupled by a pair of smooth curves expanding outwardly from the both ends.

7. The solid electrolytic capacitor according to claim 6, wherein the pair of straight lines are formed such that each length thereof is longer than a distance between the pair of straight lines.

8. The solid electrolytic capacitor according to claim 7, wherein the curves are formed in the form of an arc, while the straight lines extend tangentially of the curves.

* * * * *